April 21, 1925.

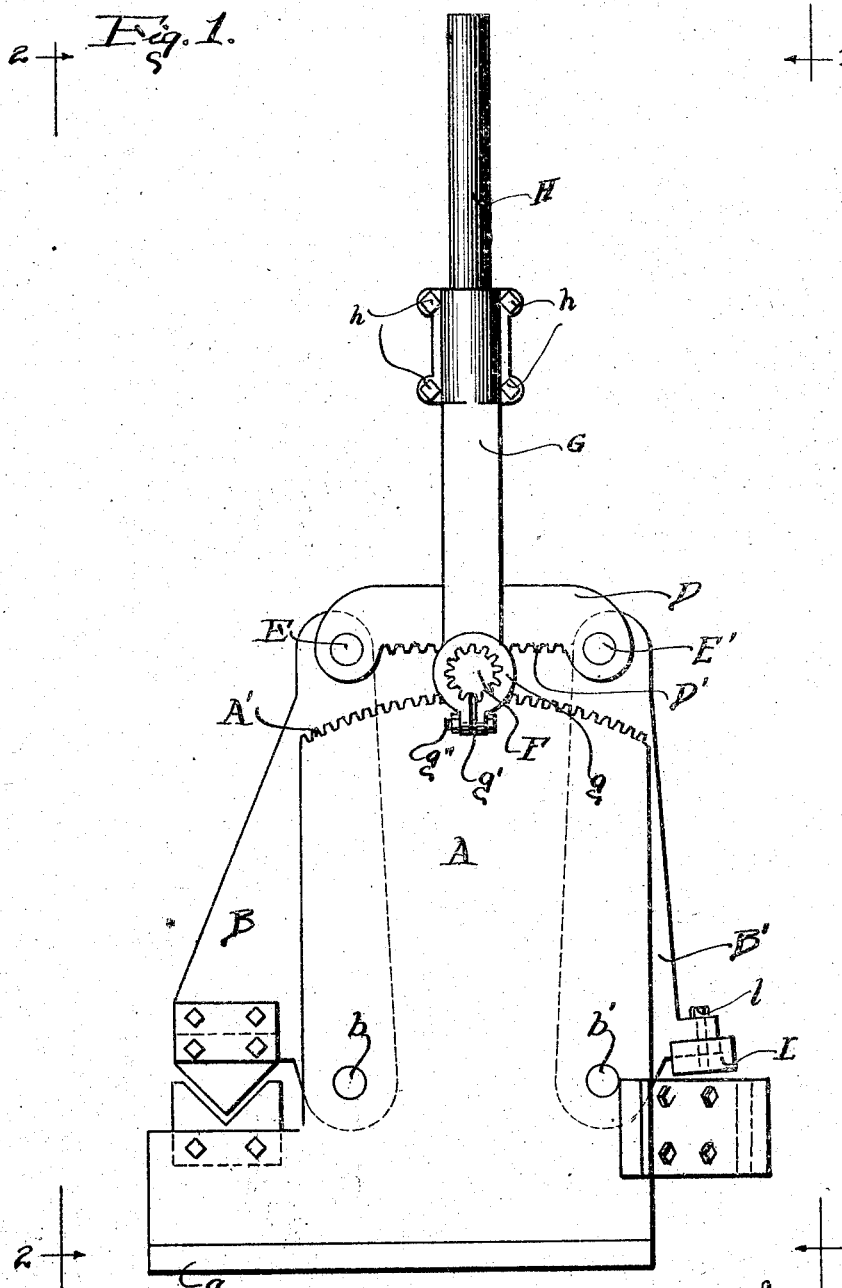

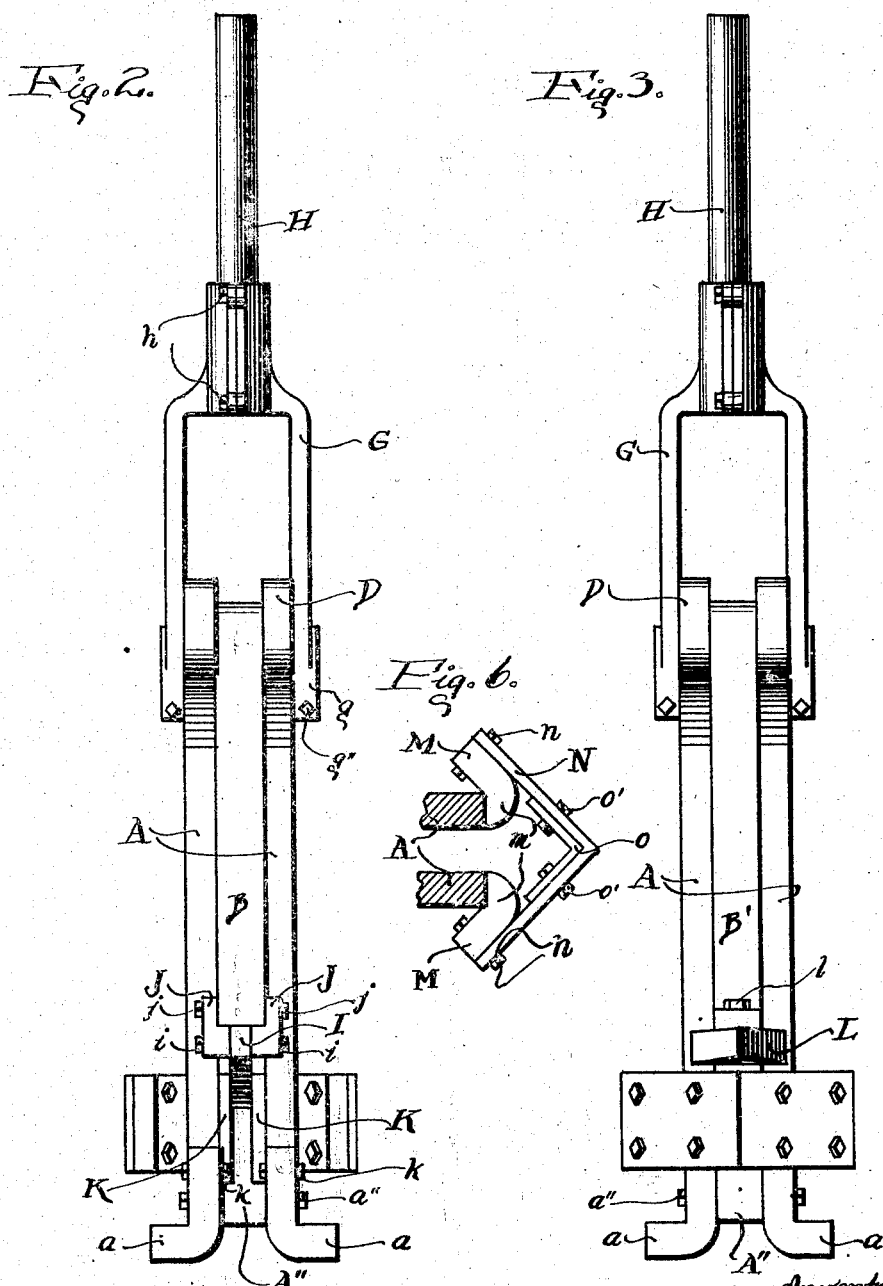

N. KRUMP

ANGLE IRON CUTTER

Filed Jan. 18, 1923

Inventor,
Nic Krump.
By Charles Turner Brown,
Atty.

Patented Apr. 21, 1925.

1,534,274

UNITED STATES PATENT OFFICE.

NIC KRUMP, OF CHICAGO, ILLINOIS.

ANGLE-IRON CUTTER.

Application filed January 18, 1923. Serial No. 613,388.

*To all whom it may concern:*

Be it known that I, NIC KRUMP, a citizen of the United States, and a resident of Chicago, in the county of Cook and State of Illinois, have invented certain new and useful Improvements in Angle-Iron Cutters, of which the following, when taken in connection with the drawings accompanying and forming a part hereof, is a full and complete specification.

This invention relates to a machine whereby a bar of angle iron may be cut in two, and also whereby a section may be cut out of one flange of a bar of angle iron.

Among the objects of this invention is to obtain a machine which will cut a bar of angle iron in two, or cut a piece off from a bar of angle iron, without distorting the flanges or changing the relative position of said flanges, in either the bar or in the piece which is cut therefrom; and a further object of the machine is to obtain means whereby a section of one flange of a bar of angle iron may be cut therefrom, the sides of said cut out section usually meeting at an angle of approximately ninety degrees, whereby the uncut flange of said bar may be bent to an angle of approximately ninety degrees, bringing the edges of the flange which remain after said section is cut therefrom into contact, or substantially so. A further object of the invention is to obtain a machine for the purposes recited which is simple in construction, durable, not liable to break or get out of order; and economically made.

I have illustrated a machine embodying this invention in the drawings referred to, in which Fig. 1 is a side elevation;

Fig. 2 is an end elevation on line 2—2 of Fig. 1, viewed as indicated by arrows.

Fig. 3 is an end elevation, on line 3—3 of Fig. 1, viewed as indicated by arrows.

Fig. 4 is a top plan view, with the handle of the machine removed.

Fig. 5 is a vertical section on line 5—5 of Fig. 2, with the handle removed.

And Fig. 6 is a horizontal section on line 6—6 of Fig. 5, viewed as indicated by arrows.

A reference character applied to designate a given part indicates said part throughout the several figures of the drawings wherever the same appears.

A, A, represent side plates which are, respectively provided with flanges $a$, $a$, at the lower ends thereof, said flanges being provided with apertures $a'$, $a'$, through which bolts or lag screws may be extended to secure the machine to a suitable base. The plates A, A, are held in spaced relation by the separator $A''$, and bolts $a''$, $a''$, which extend through said plates and separator. B, B' represent levers which are, respectively, pivotally mounted on shafts $b$, $b'$, between plates A, A. The upper ends of plates A, A, are provided with gear teeth $A'$, $A'$, which are substantially concentric to a point midway between the shafts $b$, $b'$, as say, point marked C, Fig. 5. D, D, represent geared racks, which are respectively provided with teeth $D'$, $D'$. The gear racks D, D, are mounted on the upper ends of levers B, B', as by means of the pivotal shafts E, E'. F represents a gear pinion, the teeth whereof intermesh with the teeth $A'$, $A'$, and $D'$, $D'$. G H represent a handle which is preferably made of separable parts; the part G being made of two parts which are duplicated; each of said parts being provided at the lower ends thereof with apertures $g$, $g$, which fit over the teeth of pinion F; said lower ends are also provided with slots $g'$, $g'$, and $g'''$, $g'''$, represent bolts by means of which the sides of the apertures $g$, $g$, are brought into close contact with the teeth of said pinion F. The part H of said handle G H, preferably consists of a pipe or tube, which is inserted between the upper ends of parts G, G, and said ends firmly secured thereto by bolts $h$, $h$, extending through apertures provided therefor in the upper ends of said parts.

By turning the handle G H to the right or left, as viewed in Fig. 1, the pinion F is turned and because of the teeth of said pinion being intermeshed with the teeth $A'$, $A'$, of sides A, A, said pinion will travel along said upper end of said side plates. At the same time the teeth of said pinion being engaged with the teeth $D'$, $D'$, of racks D, D, said racks will be moved in the same direction that the pinion moves, thereby moving the upper ends of levers B, B', in the same direction, said levers turning on pivots $b$, $b'$, respectively.

The levers B, B', being mounted on pivots $b$, $b'$, and the racks D, D, being mounted, as recited, on pivots E, E', at the upper ends of said levers B, B', the teeth $D'$, $D'$, of said racks D, D, will describe an arc, in their travel, which is substantially parallel with the arc in which the teeth A', A', are positioned, for the limited movements of said racks to the right or left from the position illustrated in Fig. 1, which is required in the operation of the machine, so that the pinion F is not bound between the teeth A' and D', but works freely to permit its travel to the right or left, on the upper ends of the side plates A, A, and the travel of the racks D, D, as described.

The lever B is extended to the left of pivot b, as the machine is illustrated in Figs. 1 and 5, and I represents a die which is secured to the lever B by plates J, J, and bolts i, i, j, j. K, K, represent dies which are secured in position in suitable relation to die I, between plates A, A, as by bolts k, k. When the levers B, B' are moved to the left, as above described, the die I is moved down to and a slight distance between, the dies K, K, to obtain a shearing cut on an angle bar placed between said dies, both edges of die I being cutting edges; and a portion or section of said angle bar corresponding with the distance apart of the cutting edges of said die I. By thus cutting a section out of an angle bar which is being divided into two parts by the machine, I find that no distortion is produced at the end of either part of said divided bar. The lever B', at the lower end thereof, is extended to the right of pivot b', (as viewed in Figs. 1 and 5), and L represents a die which is secured to said lever, by bolts l, l. The side plates A, A, are provided with projecting tongues near the lower ends thereof on the right hand sides thereof as viewed in Figs. 1 and 5, and said tongues are bent as at m, m, to obtain the ends M, M, (see Fig. 6), and N represents an angle iron which is secured rigidly to said ends M, M, by bolts n, n. O represents a die the inner edges whereof are cutting edges, and are placed in suitable relative position to the cutting edges of die L. Die O is held rigidly in place by bolts O', O', which extend through angle iron N and into said die.

When the handle G H, is moved to the right, as viewed in Fig. 1, the levers B, B', are moved to the right, by the pinion F engaging with teeth A', A' and the teeth D', D', as hereinbefore described, and the die L on lever B', is moved downward so that a bar of angle iron placed on the upper edge of angle iron N, with one flange of said bar extending under the die L, as indicated by broken lines P in Fig. 5, on the downward movement of said die a section of said flange corresponding in shape with the shape of the cutting edges of the dies O and L, is cut therefrom.

Where the cutting edges of dies L and O are at substantially right angles, as illustrated in Fig. 6, the uncut flange of said bar may be bent to an angle of ninety degrees, to bring the edges of the cut, made as last above described, into contact, where they may be welded, if desired.

The cutting out of a section from one flange of an angle iron bar, as above described, is made when a rectangular frame is desired. By varying the angle formed at the meeting of the cutting edges of dies L and O, a suitable section will be cut from one flange of an angle iron bar to permit said bar to be bent to form a frame with more than four sides thereto and with the cut edges meeting so they may be welded together.

I claim:

1. Pivotally mounted levers, geared racks mounted on pivots on the upper ends of said levers, in combination with rigidly mounted gear teeth in spaced relation to the path of travel of the teeth of said racks, a gear pinion positioned between said rigidly mounted gear teeth and the gear teeth of said racks and means to turn said pinion.

2. Pivotally mounted levers, connections, respectively provided with a gear rack, mounted on the free ends of said levers, to control corresponding angular movement thereof in combination with rigidly mounted gear teeth in spaced relation to the path of travel of the teeth of said racks, a gear pinion positioned between said rigidly mounted gear teeth and the gear teeth of said racks and means to turn said pinion.

NIC KRUMP.

Witnesses:
BESS BROWN,
CHARLES TURNER BROWN.